W. FULTON.
Lamp Stove.
No. 34,297. Patented Feb. 4, 1862.
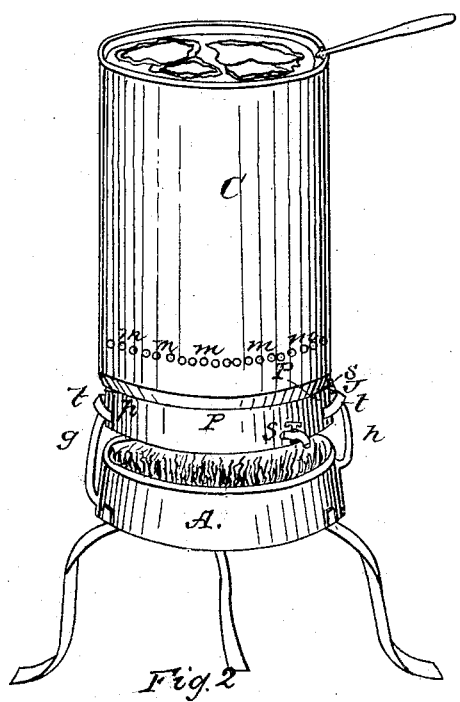
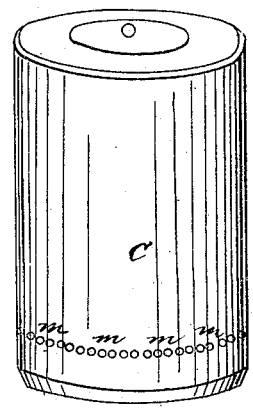
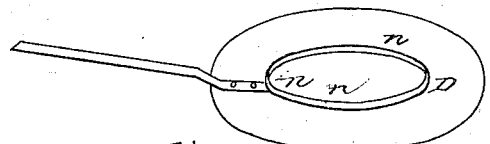
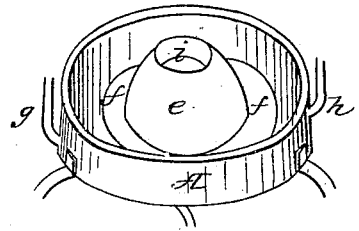
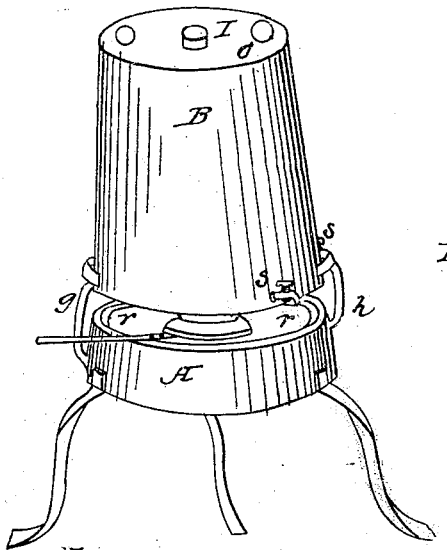
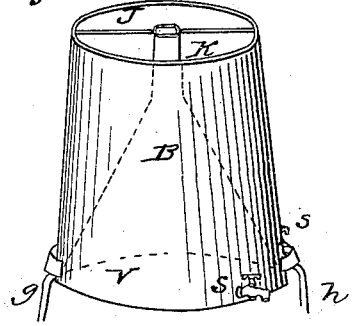

UNITED STATES PATENT OFFICE.

WILLIAM FULTON, OF ELIZABETH, NEW JERSEY.

IMPROVEMENT IN COOKING APPARATUS.

Specification forming part of Letters Patent No. 34,297, dated February 4, 1862.

*To all whom it may concern:*

Be it known that I, WILLIAM FULTON, of Elizabeth, in Union county, in the State of New Jersey, have invented a new and Improved House and Camp Stove for Cooking; and I do hereby declare that the following is a full, clear, and exact description of the same, reference being had to the accompanying drawings, and to the letters of reference marked thereon, making a part of this specification, in which—

Figure 1 is an external view of my invention with the jacket applied to it and in operation. Fig. 2 is also an external view of my invention without the jacket, showing the exterior of the reservoir or boiler. Fig. 3 is a view of the reservoir or boiler with the lid off, showing its interior construction. Fig. 4 is a view of the lid of the reservoir or boiler. Fig. 5 is a perspective view of the lamp which holds the fuel. Fig. 6 is a detached view of the jacket with the lid on. Fig. 7 is a view of the extinguisher.

Similar letters of reference indicate corresponding parts in the several figures.

This invention relates to an improvement in house and camp cooking-stoves for preparing meals in the shortest space of time possible and with the least trouble.

The object of the invention is to adapt a portable stove for frying and boiling or stewing at the same time with less labor, less expense, and more expeditiously than can be accomplished by any other means in use. This object is attained by applying an open lamp to the bottom of a reservoir or boiler, which is of a funnel shape in the interior. An ordinary-formed jacket fits over this boiler, with a movable cover at the top, so that a pan can be used in its place at any time. Alcohol, coil-oil, or naphtha is required for fuel, so that a fire can be instantly produced. The fire passing up the funnel quickly cooks whatever meat may be in the pan on the top of the jacket and at the same time boils whatever liquid may be in the reservoir, a meal being thus prepared in from six to nine minutes at the small expense of one cent and a half.

To enable those skilled in the art to fully understand and construct my invention, I will proceed to describe it.

A represents an open lamp of a circular shape and formed double, the outward and bottom part of which may be made of tin and the interior or fuel-chamber of brass or copper. Three or more legs form a support for it, which can be detached for the purpose of packing. A cone $e$ is raised in the center, so as to form a channel as a receptacle for the fuel, as shown at $f$ in Fig. 5. The cone and the portion forming the channel can be worked out of one piece of metal. The object of having a double-formed lamp is to surround the fuel with water, in order to prevent its too rapid consumption when such substances as alcohol, coal-oil, or naphtha are used. From either side of this lamp a tube protrudes, which is carried up into the water-chamber $k$ in the reservoir or boiler B, as shown in Fig. 3, forming supports for the same, as shown at $g$ and $h$ in Fig. 2. One of these tubes is made to start from the lower part of the lamp, as shown at $g$ in Fig. 2, and the other from the upper part, as shown at $h$ in Fig. 2. As the water passes down tube $g$ into the water-apartment of the lamp, the air escapes through tube $h$. In the top of cone $e$ a hole $i$ is made, as shown in Fig. 5, through which the oxygen of the air arises and unites with the carbon and hydrogen of the fuel when burning, thereby spreading the flame and causing it to act with a greater degree of intensity in the funnel or bottom of the boiler, as shown at $v$ in Fig. 3. The water which surrounds the fuel is heated, by which means a considerable amount of heat is gained which otherwise would naturally be lost, which causes the water in the reservoir or boiler B to descend through the tubes into the water-chamber of the lamp, forming a current in that and the reservoir or boiler simultaneously.

B is the reservoir or boiler, which is of a slightly-tapering shape exteriorly, as shown in Fig. 2, and of a funnel form within, as shown in Fig. 3, and is placed from a half an inch to two inches from the lamp A, according to the size of the stove, and from one inch and a half to two inches from the top of the jacket C, in accordance with the size of the stove. This reservoir can be divided into two or more apartments, as shown at $j$ and $k$ in Fig. 3, so as to prepare two or more different dishes at the same time, the water-apartment being that with which the tubes $g$ and $h$ are connected. A cover fits tightly in the top, as shown at $o$ in Fig. 2, in the center of which a hole is made, as shown in Fig. 4, so as to allow the end of the funnel to pass through. A perforated plate can be placed in the end of this funnel if it is requisite to spread the heat. When my invention is in operation, as shown in Fig. 1, the draft passing through aperture $i$ in cone $e$ causes the flame to pass up the funnel out of opening $l$, as shown in Fig. 2, to the bottom of the meat-pan and at the same time heating the outer surface of the reservoir or boiler B, thus performing the process of boiling or stewing and frying at the same time. The heat produced by the flame descends through the space between the jacket and the boiler to openings $m$ in the lower part of the jacket C, as shown in Fig. 1, where it escapes, thereby leaving a continuous heat on the bottom of the pan on the top of the jacket C containing the meat. Two or more faucets are fitted in the lower part of the reservoir for drawing off the liquids, as shown at $s$ in Fig. 2, and a handle on either side for lifting it, as shown at $t$ in Fig. 1.

C is the jacket, which is of an ordinary circular form, and may be constructed of sheet metal, any of the ordinary materials being used. It can be coated on the inner surface, if requisite, with a mixture of plaster-of-paris, so as to form a non-conductor of it to prevent the heat from escaping. A cover fits tightly on it, as shown in Fig. 6, or it is removed when preparing meat and a pan used in its place, as shown in Fig. 1. In the lower part of this jacket perforations $m$ are made, through which the air received from the funnel escapes, thereby giving a greater heating-surface to the boiler or reservoir and causing the process of boiling to go on much quicker. The jacket comes down within two or three inches of the bottom of the boiler, rests being there formed for it, as shown at $p$ in Fig. 1.

D is the extinguisher, which is composed of the same material as the jacket. A hole is made in the center, the edge being turned up all round, as shown at $n$ in Fig. 7, so that it fits tightly round the cone and fills up the channel which holds the fuel, as shown at $r$ in Fig. 2. Without the water surrounding the flame it is impossible to extinguish it at will.

This invention is useful to families and excursion parties, in military camps, hotels, or wherever it is desirable to get up a meal quickly and with little labor. When the lamp is made separate from the boiler, it will be very advantageous in oyster-saloons.

Having thus described my invention and the manner in which the same is or may be used or carried into effect, I would observe, in conclusion, that I do not confine or restrict myself to the precise details or arrangements which I have had occasion to describe or refer to, as variations may be made therefrom without deviating from the main features of my said invention; but

What I consider to be novel and original, and desire to secure by Letters Patent, is—

The combination of the lamp A with the reservoir or boiler B, jacket C, and extinguisher D, when the whole are arranged, constructed, and operated in the manner specified, and for the purpose set forth.

WM. FULTON.

Witnesses:
ROBERT McC. SHEPHERD,
PERIAM PRICE.